United States Patent
Schwartz et al.

(10) Patent No.: US 8,769,593 B1
(45) Date of Patent: Jul. 1, 2014

(54) CLIENT TERMINAL FOR STORING AN INITIAL PROGRAM SEGMENT AND APPENDING A REMAINING PROGRAM SEGMENT TO PROVIDE A VIDEO PROGRAM ON DEMAND

(75) Inventors: Peter Jay Schwartz, Fullerton, CA (US); L. Jeffrey Kapner, III, Yorba Linda, CA (US); Timothy J. Elliott, Fountain Valley, CA (US)

(73) Assignee: Keen Personal Media, Inc., Irvine, CA (US)

( * ) Notice: Subject to any disclaimer, the term of this patent is extended or adjusted under 35 U.S.C. 154(b) by 1243 days.

(21) Appl. No.: 09/872,238

(22) Filed: May 31, 2001

(51) Int. Cl.
  *H04N 7/173* (2011.01)
(52) U.S. Cl.
  USPC ............................ 725/101; 725/134; 725/142
(58) Field of Classification Search
  USPC ................................ 725/1, 101, 103, 134, 142
  See application file for complete search history.

(56) References Cited

U.S. PATENT DOCUMENTS

| | | | | |
|---|---|---|---|---|
| 5,446,489 | A | * | 8/1995 | Egendorf ............................ 725/1 |
| 5,530,754 | A | * | 6/1996 | Garfinkle ............................ 725/8 |
| 5,533,021 | A | | 7/1996 | Branstad et al. |
| 5,568,181 | A | | 10/1996 | Greenwood et al. |
| 5,619,247 | A | | 4/1997 | Russo |
| 5,790,935 | A | * | 8/1998 | Payton ............................ 725/91 |
| 5,826,168 | A | * | 10/1998 | Inoue et al. .................... 725/101 |
| 5,930,493 | A | | 7/1999 | Ottesen et al. |
| 5,936,659 | A | * | 8/1999 | Viswanathan et al. ........ 725/103 |
| 5,978,381 | A | | 11/1999 | Perlman et al. |
| 6,018,612 | A | * | 1/2000 | Thomason et al. ............. 386/82 |
| 6,208,804 | B1 | | 3/2001 | Ottesen et al. |
| 6,483,986 | B1 | * | 11/2002 | Krapf ............................ 386/68 |
| 6,701,528 | B1 | * | 3/2004 | Arsenault et al. ............... 725/89 |
| 6,757,906 | B1 | * | 6/2004 | Look et al. ..................... 725/45 |
| 2002/0056095 | A1 | * | 5/2002 | Uehara et al. ................... 725/38 |

OTHER PUBLICATIONS

PCT International Search Report dated Sep. 11, 2002; PCT/US02/17312.

* cited by examiner

*Primary Examiner* — Jason Salce

(57) ABSTRACT

A client terminal to provide a video program on demand to a client is connected to a video distribution system and a display device. The video distribution system (VDS) broadcasts a video program to the client terminal including an initial program segment (IPS) and a remaining program segment (RPS). The IPS is broadcast during a first broadcast time interval (FBTI) and the RPS is repetitively broadcast during a second broadcast time interval (SBTI). A terminal controller of the client terminal is responsive to a video control program. During the FBTI, the terminal controller records the IPS in a local memory. During the SBTI, the terminal controller selects the video program in response to a user input and displays the recorded IPS. Further, the terminal controller receives the RPS from the VDS and records it in the local memory. After displaying the recorded IPS, the terminal controller displays the recorded RPS.

14 Claims, 5 Drawing Sheets

CLIENT TERMINAL FOR STORING AN INITIAL PROGRAM SEGMENT AND APPENDING A REMAINING PROGRAM SEGMENT TO PROVIDE A VIDEO PROGRAM ON DEMAND

BACKGROUND OF THE INVENTION

1. Field of the Invention

The present invention relates to the field of communications. More particularly, the present invention relates to a client terminal, such as a set top box, for storing an initial program segment and appending a remaining program segment to provide a video program on demand to a client.

2. Description of the Prior Art

Advancements in communications technology and increased consumer sophistication have challenged the distributors of video programming to provide clients with entertainment services more convenient and accessible than those traditionally made available through cable, satellite, and broadcast television. For example, improving communications infrastructure has resulted in a proliferation of pay-per-view media services in many of the larger broadcast and cable markets. Unfortunately, most pay-per-view systems only permit the client to choose from a relatively small number of video program selections for home viewing, with the selected video programs generally being presented only at pre-scheduled viewing times.

On the other hand, more recent video on demand (VOD) systems allow a client to order a desired video program for home viewing instantaneously. VOD systems are very popular with clients who enjoy being able to watch video programs, whenever they want, without the hassle of going to a video rental store or waiting for a pre-scheduled viewing time, as with pay-per-view systems. Moreover, VOD systems are highly desired by video programming providers (e.g. cable and satellite networks), as they have been shown to significantly increase revenue in the systems in which they are deployed. Unfortunately, VOD systems are extremely capital intensive to deploy at both the video programming distribution center and in the underlying network infrastructure. This represents a significant barrier to mass industry adoption.

For example, typical VOD systems for providing VOD to a client usually include a two-way digital client terminal and a network infrastructure to provide direct connections between the video programming distribution center and the client terminal. In order to accomplish this direct connection, a forward digital channel is assigned to the client terminal for the transport of video programs and a back channel is usually needed for the purchase and control of the stream. Thus, typical VOD systems require bi-directional communication throughout the session. Therefore, a dedicated channel must be created in real-time to each client's client terminal, whenever a client demands video programming. This requires sophistical switching at the network level and sophisticated video distribution system functionality. Accordingly, for each collection of clients, there are several requirements: video distribution systems are required to store the video programming and stream the video programming to a client terminal whenever requested, forward channel switching systems are needed to establish the dedicated channel to the client from the video distribution system, and bandwidth must be allocated from a dedicated range of digital channels. Such infrastructure changes affect the video distribution system, the underlying network (e.g. distribution nodes), and the client terminal components. Thus, to implement a typical VOD system, a video programming provider must undergo major network infrastructure changes and major video distribution system upgrades to support VOD, which can represent a significant capital cost to the video programming provider.

There is, therefore, a need to provide techniques for providing VOD functionality to clients, without requiring the major changes to the video distribution system and network infrastructure required to support today's typical VOD systems.

SUMMARY OF THE INVENTION

The present invention may be regarded as a client terminal, computer program, and method to provide a video program on demand to a client. The client terminal is connectable to a video distribution system and a display device. The video distribution system broadcasts at least one video program to the client terminal. The at least one video program includes an initial program segment and a remaining program segment. The initial program segment is broadcast during a first broadcast time interval and the remaining program segment is repetetively broadcast during a second broadcast time interval. The client terminal comprises a video input interface to receive the initial program segment and the remaining program segment, a user interface to receive user input, a display interface to display the at least one video program on the display device, a local memory to store a video control program, and a terminal controller responsive to the video control program. During the first broadcast time interval, the terminal controller responsive to the video control program records the initial program segment for the at least one video program in the local memory.

During the second broadcast time interval, the terminal controller responsive to the video control program selects the at least one video program in response to user input and streams the recorded initial program segment associated with the selected video program from the local memory to the display interface for display on the display device. Further, the terminal controller responsive to the video control program receives the remaining program segment associated with the selected video program from the video distribution system and records the received remaining program segment in the local memory. After streaming the recorded initial program segment to the display interface, the terminal controller responsive to the video control program streams the recorded remaining program segment from the local memory to the display interface for display on the display device such that the recorded remaining program segment is appended to the initial program segment. In some embodiments, in response to the selection of the at least one video program, the terminal controller responsive to the video control program directs a billing system at the video distribution system to bill a client associated with the client terminal.

DESCRIPTION OF THE PREFERRED EMBODIMENTS

Figure 1A:
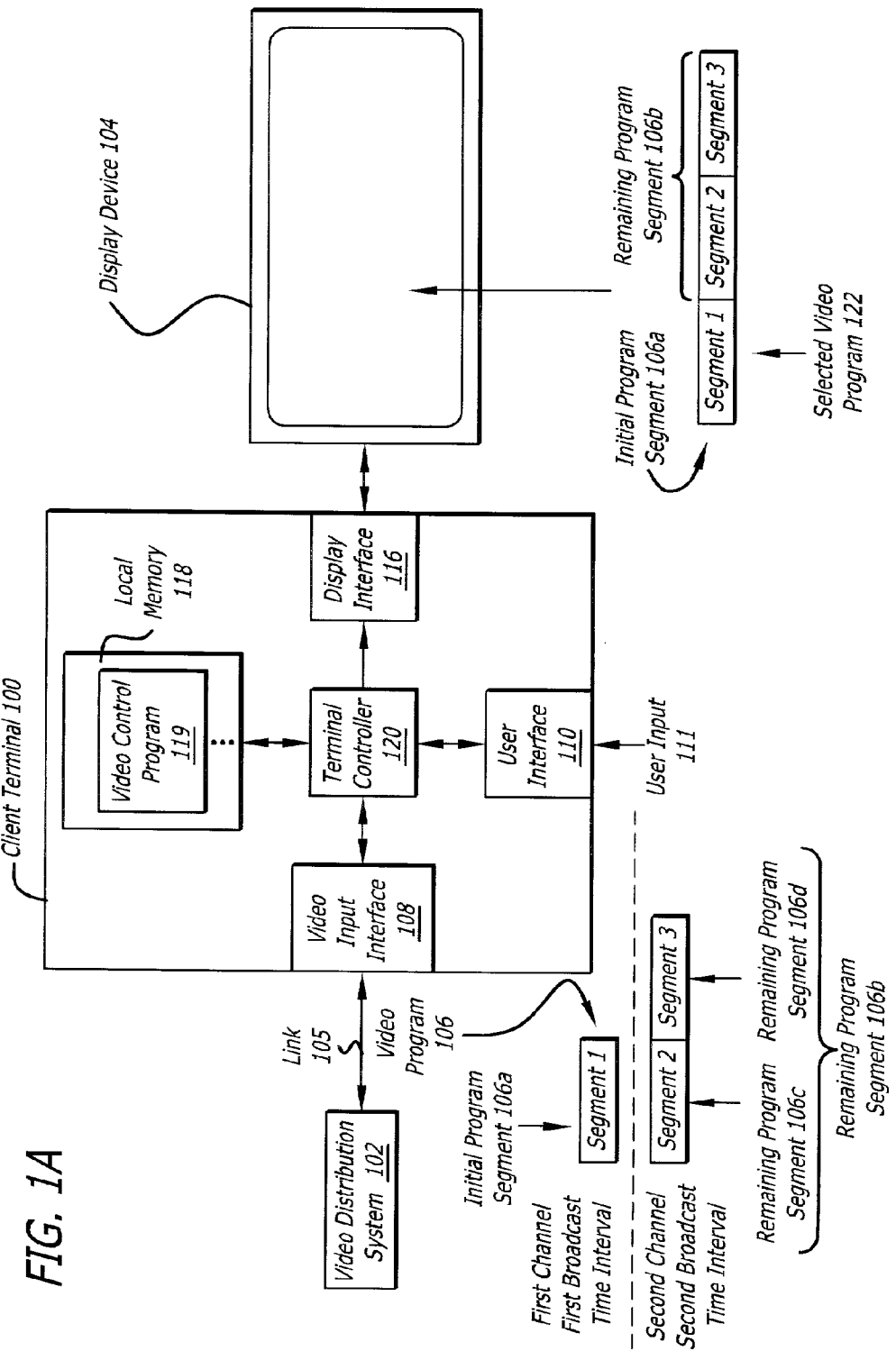
FIG. 1A shows a client terminal according to an embodiment of the present invention connected to a video distribution system and a display device to provide a video program on demand to a client.

FIG. 1A shows a client terminal 100 connected to a video distribution system 102 and a display device 104 to provide a selected video program 122 to a client according to an embodiment of the present invention. The video distribution system 102 broadcasts at least one video program 106 to the client terminal 100. The at least one video program 106 includes an initial program segment 106a that is broadcast during a first broadcast time interval and a remaining program segment 106b that is broadcast during a second time interval. Alternatively, the video distribution system 102 can broadcast a plurality of video programs.

The video distribution system 102 can be a cable head-end, a satellite head-end, a terrestrial broadcast head-end, or a computer server head-end capable of broadcasting the at least one video program 106. The display device 104 is typically a television, computer monitor, or any other sort of display device.

The at least one video program 106 can be transmitted in a digital format (e.g. Moving Pictures Experts Group (MPEG)-2 format, Advanced Television System Committee (ATSC) format, Digital Video Broadcast (DVB) format, Open Cable format etc.) or analog format (e.g. National Television Standard Committee (NTSC)) across a link 105 from the video distribution system 102 to the client terminal 100. The link 105 can be broadly defined as a communication network formed by one or more transport mediums. The link 105 can include a variety of communication networks such cable networks, terrestrial broadcast networks, satellite networks, computer networks (e.g. wide area networks (WANs), the Internet, local area networks (LANs), etc), or generally any sort of public or private communications network, and combinations thereof. Examples of a transport medium include, but are not restricted to electrical wire, optical fiber, cable, or wireless channels using terrestrial, satellite, radio frequency, or any other wireless signaling methodology.

The at least one video program 106 typically includes audio and video (A/V) information (e.g. a movie, television program, etc.) but can also include other types of information such as data. For example, the data portion of a digitally broadcasted at least one video program 106 may include graphics, video, web pages, multimedia, text, and other types of data in a variety of differing data formats (e.g. Internet Protocol (IP), Advanced Television Enhancement Forum (ATVEF) content, etc.). Further, the at least one video program 106 includes an initial program segment (Segment 1) 106a and a remaining program segment 106b (Segment 2+Segment 3).

The client terminal 100 of FIG. 1A includes a video input interface 108, a user interface 110, a display interface 116, a local memory 118, and a terminal controller 120. The video input interface 108 receives the at least one video program 106 via the link 105. The user interface 110 is used to receive user/client input 111. Typically, the user input 111 is used to select a video program and to perform other functionality associated with a client terminal (e.g. changing channels).

The user input 111 can be from a remote control (e.g. infrared or optical), mouse, touch screen, voice activation, keyboard, or basically any sort of input device to transmit the selection of the user/client to the client terminal 100. The display interface 116 displays the video program 106 on the display device 104. The local memory 118 is used to store a video control program 119 and is also used to store the initial program segment 106a and the remaining segment 106b of the at least one video program 106, respectively. In one embodiment, the local memory 118 includes a rotating storage disk (e.g. magnetic, optical, etc.). Alternatively, the local memory 118 can include any type of semiconductor memory. The terminal controller 120 is responsive to the video control program 119 to perform many of the functions of the client terminal 100, as will be discussed. As should be appreciated by those skilled in the art, the terminal controller 120 generally includes a suitable processor and associated memory. Moreover, it should be appreciated that client terminals with recording capabilities and other types of set top boxes are well known in the art.

In one embodiment, the video control program 119 is generally implemented by the terminal controller 120 of the client terminal 100 as one or more instructions or code segments. The instructions/code segments which when read and executed by the terminal controller 120 cause the terminal controller 120 to perform the operations necessary to implement the various functions according to embodiments of the invention. Generally, the instructions/code segments are tangibly embodied in and/or readable from a machine-readable medium, device, or carrier, such as memory, data storage devices, and/or a remote device contained within or coupled to the client terminal 100. The instructions/code segments may be loaded from memory (e.g. local memory 118), data storage devices, and/or remote devices into the terminal controller 120 for use during operations.

During the first broadcast time interval, the terminal controller 120 responsive to the video control program 119 records an initial program segment 106a for the at least one video program 106 in the local memory 118. In one embodiment, the terminal controller 120 selects one of a plurality of channels to receive and record the initial program segment 106a during the first broadcast time interval.

During the second broadcast time interval, the terminal controller 120 responsive to the video control program 119 selects the at least one video program 106 in response to user/client input 111 and streams the recorded initial program segment 106a associated with the selected video program 122 to the display interface 116 for display on the display device 104. Thus, the user/client can instantaneously, on demand, begin viewing the at least one video program 106. Further, the terminal controller 120 responsive to the video control program 119 receives the remaining program segment 106b associated with the selected video program 122 from the video distribution system 102 and records the received remaining program segment 106b in the local memory 118 as the initial program segment 106a is being displayed. After streaming the recorded initial program segment 106a to the display interface 116 for display to the client, the terminal controller 120 responsive to the video control program 119 streams the recorded remaining program segment 106b from the local memory 118 to the display interface 116 for display on the display device 104 such that the recorded remaining program segment 106b is appended to the initial program segment 106a. Accordingly, the client is able to watch the entire selected video program 122, instantaneously, on demand.

In this way, by combining the real-time broadcast of a remaining program segment 106b and a stored initial program segment 106a, the at least one video program 106 can be provided on demand to a client. Furthermore, this is achieved at the client terminal 100 without using excessive amounts of network bandwidth, implementing major changes to the existing network infrastructure and video distribution system, or creating excessive costs in deployment. Moreover, a dedicated direct and persistent connection is not required between the video distribution system 102 and the client terminal 100.

Figure 1B:
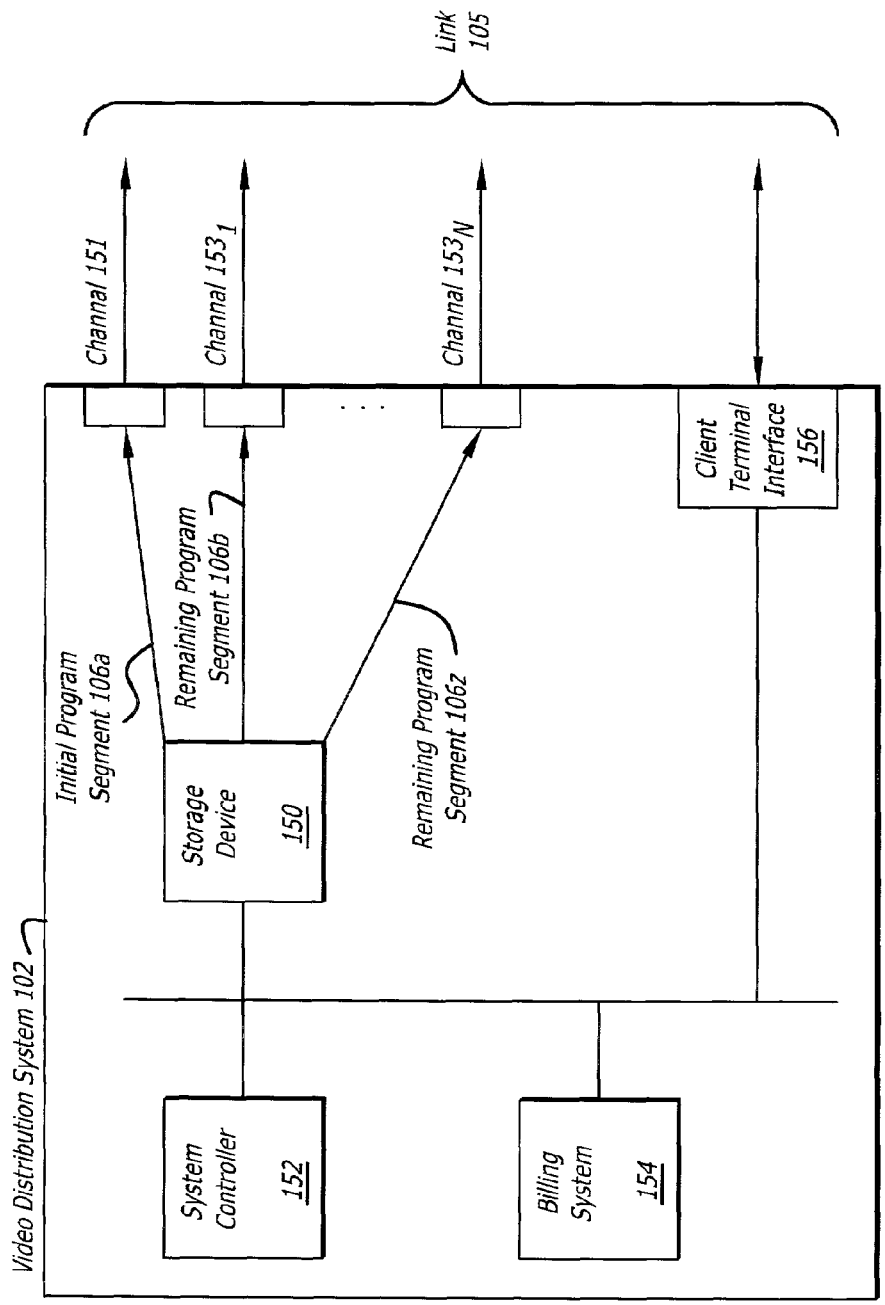
FIG. 1B shows a more specific embodiment of the video distribution system of FIG. 1A.

FIG. 1B shows a more specific embodiment of the video distribution system 102 of FIG. 1A. As shown in FIG. 1B, the video distribution system 102 includes a storage device 150, a system controller 152, a billing system 154, and a client terminal interface 156. The storage device 150 is used to store the at least one video program 106. The system controller 152 splits the at least one video program 106 into an initial program segment 106a and a remaining program segment 106b. Alternatively, the system controller 152 can split the remaining program segment 106b into any number of remaining program segments $106_{b-z}$. The system controller 152 controls the broadcast of the initial program segment 106a on a first channel 151 during a first broadcast time interval to the client terminal 100 via the link 105. Further, the system controller 152 controls a repetitive broadcast of the remaining program segment 106b on another channel $153_1$ during a second broadcast time interval to the client terminal 100 via the link 105. Alternatively, the system controller 152 controls a repetitive broadcast of remaining program segments $106_{b-z}$ on each of the channels $153_{1-N}$, respectively, during the second broadcast time interval to the client terminal 100 via the link 105. It should be noted that the first channel 151 can also be used for transmitting remaining program segments. The first channel 151 is shown separately merely for illustrative purposes. Also, alternatively, the initial program segment 106a can be broadcasted with the remaining program segments $106_{b-z}$.

The system controller 152 can also direct the billing system 154 to bill a client for the purchase of the at least one video program 106. The client terminal 100, in response to the selection of the at least one video program 106, directs the video distribution system 102 to bill a client associated with the terminal by sending a purchase notice to the video distribution system 102. When the video distribution system 102 receives the purchase notice through the client interface 156 that a client terminal 100 has purchased the at least one video program 106, in response, the system controller 152 directs the billing system 154 to bill a client associated with the client terminal 100. In one embodiment, the purchase notice is sent from the client terminal 100 to the video distribution system 102 immediately after the client has selected the at least one video program 106 and the recorded initial program segment 106a is streamed to the display device 104. In yet another embodiment, the purchase notice can be stored in local memory 118 of the client terminal 100, and the client terminal 100 at a later time sends the purchase notice to the video distribution system 102. Alternatively, the video distribution system 102 can poll the client terminal 100 for the purchase notice.

Figure 2A:
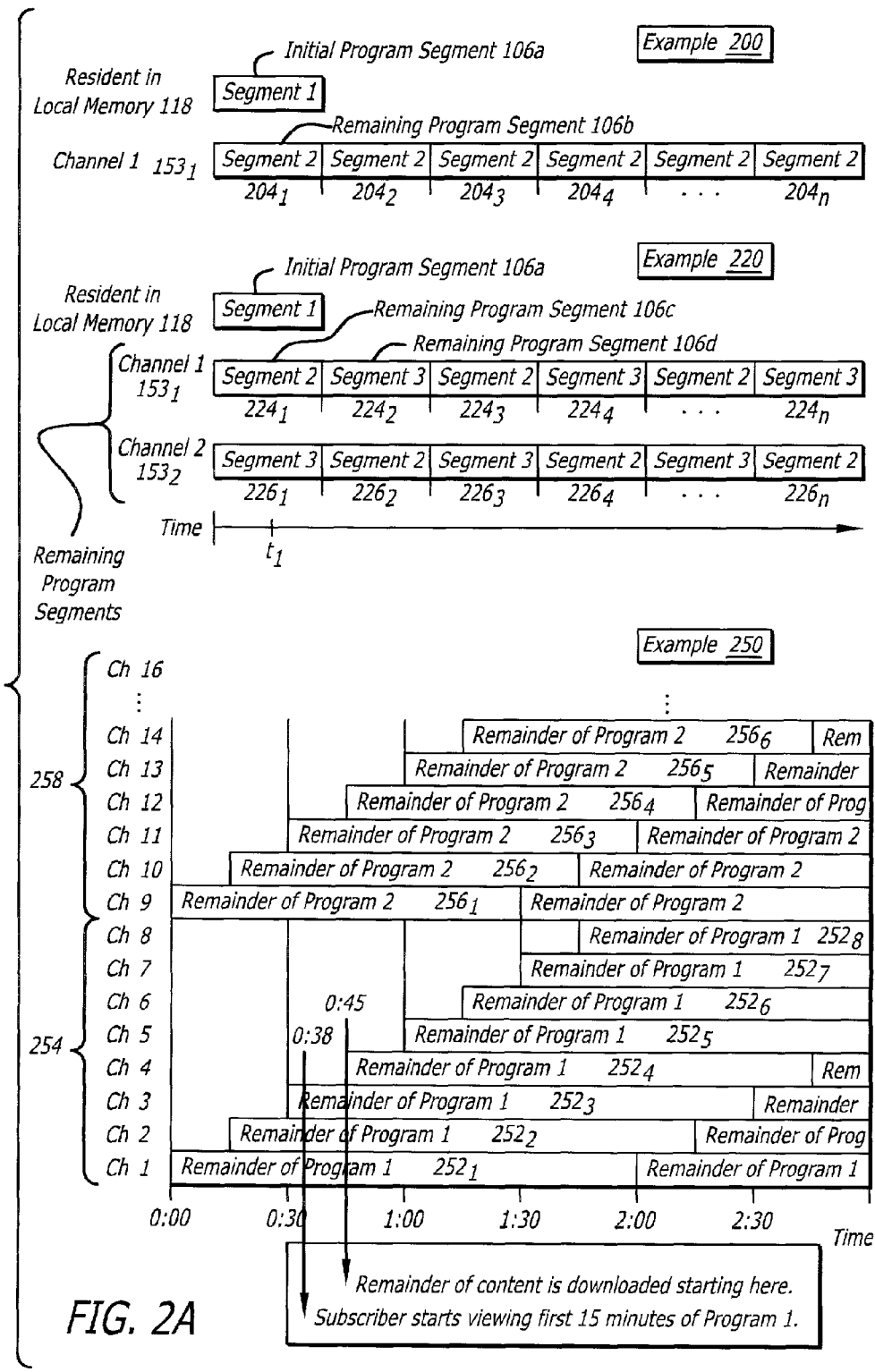
FIG. 2A is a diagram illustrating examples of how a video program can be divided into an initial program segment and remaining program segments and provided to the client terminal to enable video programs on demand to the client.

FIG. 2A is a diagram illustrating examples of how the at least one video program 106 can be divided into an initial program segment 106a and remaining program segments and can be provided to the client terminal 100 to enable video programs on demand to the client.

Looking at example 200, the initial program segment 1 106a is stored in local memory 118 of the client terminal 100. As previously discussed, the initial program segment 106a can be broadcasted to the client terminal 100 for storage on a first channel 151 during a first broadcast time interval. For example, the first broadcast time interval can occur during off peak hours when most clients are not utilizing their client terminals (e.g. late at night). The initial program segment 1 106a is resident in the local memory 118, but is not accessible to the client until the client selects the at least one video program 106 associated with the initial program segment 106a. As previously discussed, once the user/client selects the at least one video program 106, the system controller 152 of the video distribution system 102 directs the billing system 154 to bill the client associated with the client terminal 100.

During the second broadcast time interval, the remaining program segment 2 106b is repetitively broadcast on channel 1 $153_1$ to the client terminal 100. Each remaining program segment 2 106b occupies a segment slot $204_{1-n}$, respectively. Once the user selects the at least one video program 106, the terminal controller 120 responsive to the video control program 119 streams the recorded initial program segment 1 106a associated with the selected video program 122 from the local memory 118 to the display interface 116 for display on the display device 104. Further, the terminal controller 120 responsive to the video control program 119 begins simultaneously recording the remaining program segment 2 106b associated with the selected video program 122 in the local memory 118 as the initial program segment 106a is being displayed. After streaming the recorded initial program segment 106a to the display interface 116 for display to the client, the terminal controller 120 responsive to the video control program 119 streams the recorded remaining program segment 2 106b from the local memory 118 to the display interface 116 for display on the display device 104 such that the recorded remaining program segment 2 106b is appended to the initial program segment 106a. Accordingly, the client is able to watch the entire selected video program 122, instantaneously, on demand. Also, alternatively, the initial program segment 106a can be broadcasted with the remaining program segments 106b.

It can be seen in Example 200 that because the length of the remaining program segment 2 106b is the same as the length of the initial program segment 1 106a, it does not matter at what point in a segment slot 204 of remaining program segment 2 106b that the terminal controller 120 starts simultaneously recording the remaining program segment 2 106b (as it begins to display the initial program segment 1 106a). This is because by the time the initial program segment 1 106a is finished being displayed, the whole remaining program segment 2 106b will be recorded and will be ready for display. Alternatively, in another embodiment, at whatever point in time the terminal controller 120 starts to display the initial program segment 1 106a, the terminal controller 120 can wait until the beginning of the next adjacent segment slot 204 of the remaining program segment 2 106b to begin recording the remaining program segment 2 106b. This is because as long there is some amount time that the terminal controller 120 can begin recording the remaining program segment 2 106b before the end of the display of the initial program segment 1 106a, the terminal controller 120 can still begin streaming the recorded portion of the remaining program segment 2 106b to the display device 104 as it continues to record the rest of the remaining program segment 2 106b.

This way of handling video programming allows the video programming provider to implement a system with video on demand functionality with very low infrastructure cost. It also enables the client terminal 100 to efficiently use local memory 118, such as a rotating storage disk. For example, the average 1 and ½ hour movie takes between 4.5-6 Gigabytes of storage space. Thus, 5 whole video programs (e.g. movies) stored in local memory would occupy 30 Gigabytes, which is the current capacity of many of today's client terminals. However, utilizing the client terminal 100 according to embodiments of the invention, 5 whole video programs (e.g. movies) can be delivered to a client on demand, while only approximately 15 Gigabytes of storage space in local memory 118 for storing the initial program segments of the associated video programs (e.g. movies) is used.

In other embodiments of the invention, as shown in Example 220, a plurality of remaining program segments and a plurality of channels can be utilized. As previously discussed, the initial program segment 1 106a is stored in local memory 118 of the client terminal 100. The remaining program segment 106b can be further divided into a plurality of remaining program segments, e.g. remaining program segment 2 106c and remaining program segment 3 106d, that are staggered while being repetitively broadcast over a plurality of channels, e.g. channel 1 and 2 ($153_1$ and $153_2$), respectively, during the second broadcast time interval. The terminal controller 120 responsive to the video control program 119 selects at least one of the plurality of channels, e.g. channel 1 or 2 ($153_1$ or $153_2$), to receive and record each of the remaining program segments, e.g. remaining program segments 2 and 3 (106c and 106d), so that the recorded remaining program segments are appended to the initial program segment 106a. Also, each remaining program segment 2 106c and remaining program segment 3 106d on channel 1 $153_1$ occupies a segment slot $224_{1-n}$, respectively, and each remaining program segment 2 106c and remaining program segment 3 106d on channel 2 $153_2$ occupies a segment slot $226_{1-n}$, respectively. Also, alternatively, the initial program segment 106a can be broadcasted with the remaining program segments $106_{b-z}$.

Once the client selects the at least one video program 106, the terminal controller 120 responsive to the video control program 119 streams the recorded initial program segment 1 106a associated with the selected video program 122 from the local memory 118 to the display interface 116 for display on the display device 104. Further, the terminal controller 120 responsive to the video control program 119 simultaneously selects one of the channels 1 or 2 ($153_1$ or $153_2$) and begins to record the remaining program segments 2 and 3 (106c and 106d) in the local memory 118, as the initial program segment 106a is being displayed. Typically, the terminal controller 120 will select the channel for recording that has the next remaining program segment (after the initial program segment) beginning in the next adjacent segment slot. In the Example 220, at time $t_1$, the terminal controller 120 would select channel 2 $153_2$ at time $t_1$ because the next remaining program segment 2 106c follows the initial program segment 1 106a in the next adjacent segment slot $226_2$. Thus, the terminal controller 120 records the last portion of remaining program segment 3 106d (slot $226_1$) at time $t_1$ and continues recording the remaining program segment 2 106c (slot $226_2$) and the first portion of remaining program segment 3 106d (slot $226_3$). Alternatively, the terminal controller 120 responsive to the video control program 119 can tune to a plurality of channels simultaneously, e.g. channels 1 and 2 ($153_1$ and $153_2$), and simultaneously record the plurality of remaining program segments, e.g. remaining program segments 2 and 3 (106c and 106d), to achieve further efficiencies.

After streaming the recorded initial program segment 106a to the display interface 116 for display to the client, the terminal controller 120 responsive to the video control program 119 streams the recorded remaining program segment 2 106c and the recorded remaining program segment 3 106d from the local memory 118 to the display interface 116 for display on the display device 104 such that the recorded remaining program segments 2 and 3 (106c and 106d) are appended to the initial program segment 106a. Accordingly, the client is able to watch the entire selected video program 106, instantaneously, on demand.

It can be seen that because the lengths of remaining program segments 2 and 3 (106c and 106d) are each the same length as the length of initial program segment 1 106a, it does not matter at what point that the terminal controller 120 starts simultaneously recording the remaining program segment 3 106d, because by the time the initial program segment 1 106a is finished being displayed, a portion of the remaining program segment 2 106c will be recorded and will be ready for display. Thus, the client terminal 100 can display remaining program segment 2 106c while continuing to record the rest of remaining program segment 2 106c and remaining program segment 3 106d.

Alternatively, in another embodiment, the terminal controller 120 still selects the channel for recording that has the next remaining program segment (after the initial program segment) beginning in the next adjacent segment slot. However, in this embodiment, the terminal controller 120 then waits until the next remaining program segment that follows the initial program segment in the next adjacent segment slot begins, and then starts recording. In this Example 220, again at time $t_1$, the terminal controller 120 would select channel 2 $153_2$ and would wait until remaining program segment 2 106c begins in the next adjacent slot $226_2$ and would then begin recording remaining program segment 2 106c and then continue to record remaining program segment 3 106d. Again, by the time initial program segment 106a has finished being displayed, a portion of the remaining program segment 2 106c will be recorded and ready for display. Thus, the client terminal 100 can display remaining program segment 2 106c while continuing to record the rest of remaining program segment 2 106c and remaining program segment 3 106d.

By using two channels and two remaining program segments, repetetively broadcast on each of the two channels further efficiencies are realized. This embodiment further enables the client terminal 100 to efficiently use local memory 118, such as a rotating storage disk. As discussed above, the average 1 and ½ hour movie takes between 4.5-6 Gigabytes of storage space and 5 whole video programs (e.g. movies) stored in local memory would occupy 30 Gigabytes, which is the current capacity of many of today's client terminals. However, utilizing the client terminal 100 according to embodiments of the invention, 5 whole video programs (e.g. movies) can be delivered to a client on demand, while only using approximately 10 Gigabytes of storage space in local memory 118 for storing the initial program segments of the associated video programs (e.g. movies).

As should be appreciated by those skilled in the art any number of remaining program segments and remaining program segment channels can be used to implement embodiments of the invention. Greater efficiencies can be realized in terms of decreasing the amount of local memory storage space in the client terminal required to store initial program segments by using a greater number of remaining program segments and remaining program segment channels. Thus, trade offs can be made between the number of remaining program segments and remaining program segment channels utilized versus the amount of local memory storage space in the client terminal required to store initial program segments.

In yet another example 250, it is assumed the first 15 minutes of two video programs (program 1 and program 2, respectively), are downloaded and stored in local memory 118 of the client terminal 100 as first and second initial program segments, respectively. Each video program is assumed to be 2 hours and 15 minutes. To provide the remainders of the video programs, a continuous carousel of the remaining portions of each video program is broadcast on a plurality of channels. Thus, multiple versions of each program are broadcast on different channels, with each version being delayed from the previous one by 15 minutes. Particularly, eight remainder of program 1 portions $252_{1-8}$ are broadcast in a continuous carousel fashion among remainder program channels 1-8 254, respectively, and remainder of program 2 portions $256_{1-8}$ are broadcast in a continuous carousel fashion among remainder program channels 9-16 258, respectively. In keeping with the previous example, each remainder of the program 1 or 2 portions would include eight remaining program segments (e.g. Segment 2, Segment 3, Segment 4, Segment 5, Segment 6, Segment 7, Segment 8, and Segment 9), each being 15 minutes long, that are broadcast in a staggered fashion (as discussed previously) among the eight channels.

Once the client selects the desired video program, program 1 or program 2, the terminal controller 120 responsive to the video control program 119 streams the associated recorded initial program segment from the local memory 118 to the display interface 116 for display on the display device 104. Further, the terminal controller 120 responsive to the video control program 119 simultaneously selects a given channel 1-16 having the next occurring remainder of the program portion 252 or 256 associated with the desired video program and records the remainder of the program portion 252 or 256 in the local memory 118.

After streaming the recorded initial program segment to the display interface 116 for display to the client, the terminal controller 120 responsive to the video control program 119 streams the recorded remaining program portion 252 or 256 from the local memory 118 to the display interface 116 for display on the display device 104 such that the recorded remainder of the program portion 252 or 256 is appended to the initial program segment.

As a particular example, with reference to example 250, assume that the client at 1:38 pm selects video program 1, the terminal controller 120 responsive to the video control program 119 streams the associated recorded initial program segment from the local memory 118 to the display interface 116 for display on the display device 104. Further, the terminal controller 120 responsive to the video control program 119 simultaneously selects channel 4 having the next occurring remainder of the program 1 portion $252_4$ at 1:45 pm associated with the desired video program and at 1:45 pm begins recording the remainder of the program 1 portion $252_4$ in the local memory 118.

After streaming the recorded initial program segment to the display interface 116 for display to the client, the terminal controller 120 responsive to the video control program 119 at 1:53 pm streams the recorded remainder of program 1 portion $252_4$ from the local memory 118 to the display interface 116 for display on the display device 104 such that the recorded remainder of program 1 portion $252_4$ is appended to the initial program segment. Thus, the client terminal 100 can display the remainder of program 1 portion $252_4$ recorded thus far while continuing to record the rest of the remainder of program 1 portion $252_4$. Accordingly, the client is able to watch the entire video program, instantaneously, on demand and it appears to the client as if the video program was immediately available without delay. Also, the storage requirement for the 15 minute initial program segment is only 0.5 Gigabytes per program.

Advantageously, this type video program on demand is achieved at the client terminal without using excessive amounts of network bandwidth, implementing major changes to the existing network infrastructure and video distribution system, or creating excessive costs in deployment. Furthermore, a dedicated direct and persistent connection is not required between the video distribution system 102 and the client terminal 100. Also, the terminal controller 120 of the client terminal 100 responsive to the video control program 119 can add previews of new video programs as they become available and remove video program content (e.g. initial program segments and remaining program segments) as it becomes outdated. Additionally, to the extent the video program is stored in local memory 118, the client has the ability to perform full trick play capabilities (pause/rewind/fast-forward etc.) on the video program. Security issues can be minimized in number of ways. For example, the video program content can be encrypted in local memory 118. Also, a key with a finite lifetime can be used to ensure that video program content can only be viewed during a finite time period.

Figure 2B:
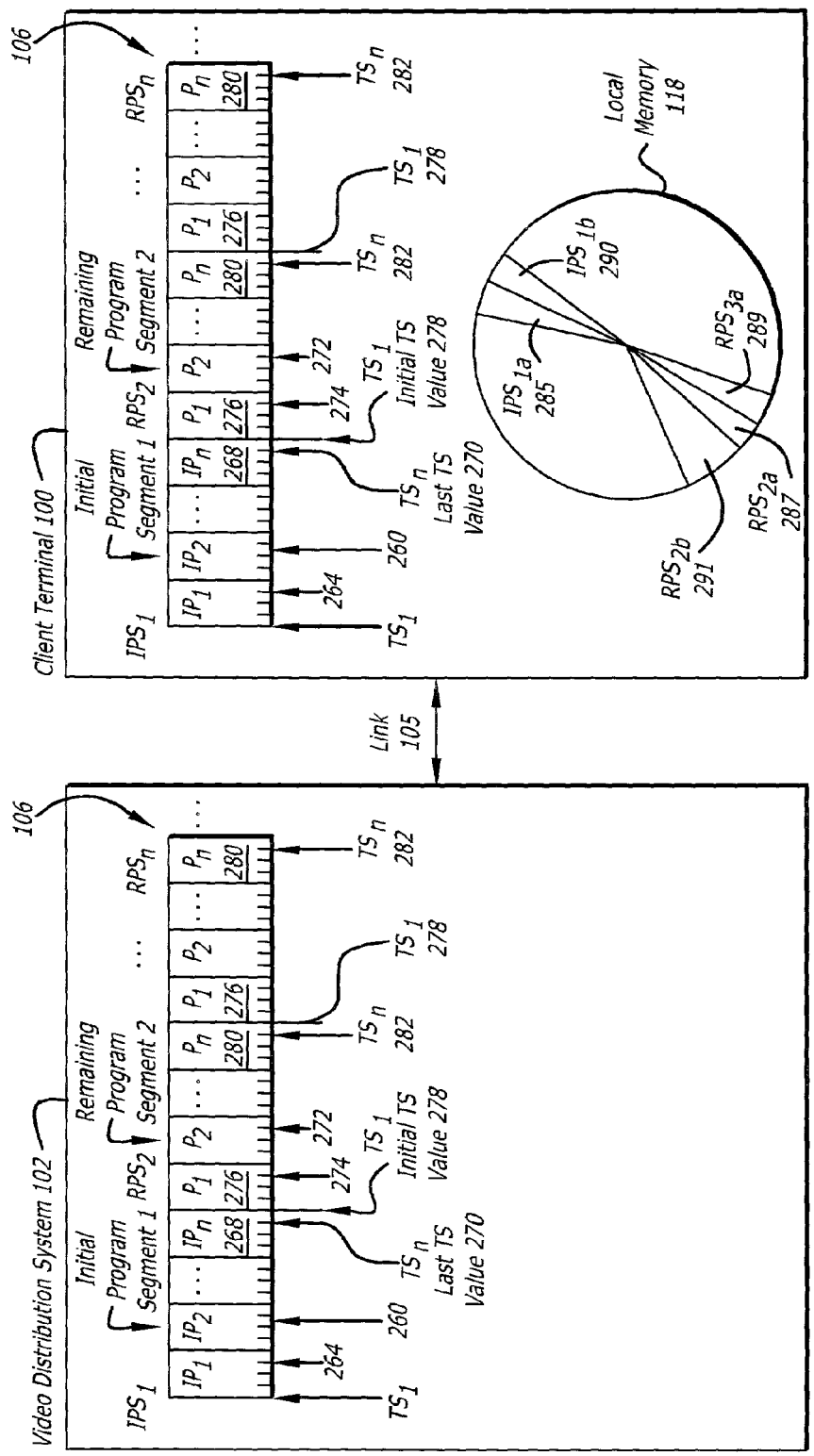
FIG. 2B illustrates the video distribution system time stamping an initial program segment and at least one remaining program segment of a video program with time stamps (TSs) and the client terminal utilizing the TSs to append the initial program segment with the at least one remaining program segment.

A technique for appending the initial program segment to at least one remaining program segment will now be discussed. Turning to FIG. 2B, FIG. 2B illustrates the video distribution system 102 time stamping segments of the at least one video program 106 with time stamps (TSs) and the client terminal 100 utilizing the TSs to append an initial program segment with at least one remaining program segment.

More particularly, the system controller 152 of the video distribution system 102 divides the initial program segment 1 ($IPS_1$) into a plurality of initial packets ($IP_{1-n}$) 260 and time stamps each initial packet such that each initial packet has a plurality of time stamps (TSs) 264. Thus, $IPS_1$ includes a plurality of $TSs_{1-n}$. A last packet 268 of the initial packets includes a last TS value ($TS_n$) 270. Furthermore, the system controller 152 of the video distribution system 102 divides each remaining program segment 2 through n ($RPSs_{2-n}$) into a plurality of packets ($P_{1-n}$) 272 and time stamps each packet such that each packet has a plurality of time stamps (TSs) 274. Thus, each RPS has a plurality of $TSs_{1-n}$. For each RPS, a first packet ($P_1$) 276 of the plurality of packets 272 includes an initial TS value ($TS_1$) 278 and a last packet 280 that includes a last TS value ($TS_n$) 282.

The client terminal 100 receives the initial program segment 1 ($IPS_1$) and the remaining program segments ($RPSs_{2-n}$) via link 105, as previously discussed, with the encoded TS values, and stores them in local memory 118. For example, as shown in FIG. 2B, the local memory 118 stores for a first video program $IPS_{1a}$ 285, $RPS_{2a}$ 287, and $RPS_{3a}$ 289 and for a second video program $IPS_{1b}$ 290 and $RPS_{2b}$ 291. It should be appreciated that any number of IPSs and RPSs can be stored in local memory 118 depending upon memory capacity.

As an example of the technique for appending the initial program segment to at least one remaining program segment, the terminal controller 120 responsive to the video control program 119 appends the recorded remaining program segment $RPS_{2a}$ 287 to the initial program segment $IPS_{1a}$ 285 such that the at least one video program 106 is continuously streamed for display on the display device 104. To do this the terminal controller 120 responsive to the video control program 119, determines the initial TS value ($TS_1$) 278 of $RPS_{2a}$ and the last TS value ($TS_n$) 270 of $IPS_{1a}$ and streams $RPS_{2a}$ at the initial TS value ($TS_1$) 278 from local memory 118 to the display device 104 immediately following the last TS value ($TS_n$) 270 of $IPS_{1a}$ such that the at least one video program 106 is continuously streamed for display on the display device 104. In the case where there is only an initial program segment and one remaining program segment, this is all that would be needed to be done to continuously display the whole at least one video program 106.

In the current example, where there are two remaining program segments. $RPS_{3a}$ also needs to be appended to $RPS_{2a}$. In a similar fashion, the terminal controller 120 responsive to the video control program 119, determines the initial TS value ($TS_1$) 278 of $RPS_{3a}$ (occurring directly after the $RPS_{2a}$) and the last TS value ($TS_n$) 282 of $RPS_{2a}$ and streams $RPS_{3a}$ at the initial TS value ($TS_1$) 278 from local memory 118 to the display device 104 immediately following the last TS value ($TS_n$) 282 of $RPS_{2a}$ such that the at least one video program 106 is continuously streamed for display on the display device. It should be appreciated by those skilled in the art that this technique can extended to any number of remaining program segments stored in local memory 118. Furthermore, although this technique has been described utilizing time stamp values, it should be appreciated that program clock reference (PCR) values from the video distribution system 102, utilized by most type of head ends, could also be used.

Figure 3:
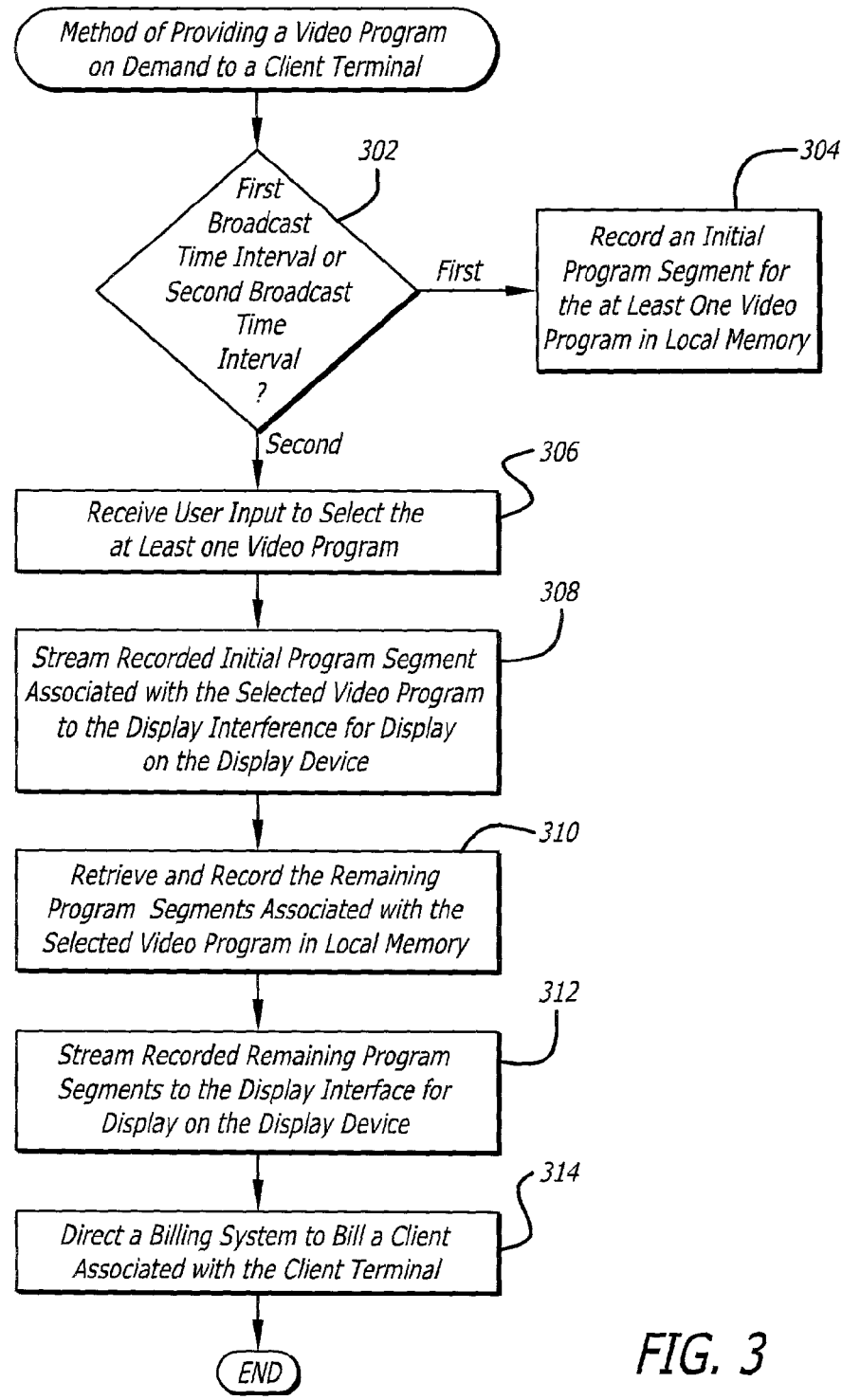
FIG. 3 is a flow diagram according to the embodiment of the invention shown in FIG. 1A.

FIG. 3 is a flow diagram according to the embodiment of the invention shown in FIG. 1A. The flow diagram 300 illustrates a method of providing a video program on demand to a client terminal 100. At step 302, the terminal controller 120 responsive to the video control program 119 determines whether the first broadcast time interval is occurring or whether it is the second broadcast time interval. If the first broadcast time interval is occurring, at step 304, the terminal controller 120 responsive to the video control program 119 records the initial program segment 106a for the at least one video program 106 being broadcasted in local memory 118. On the other hand, if it is the second broadcast time interval, then at step 306, the terminal controller 120 responsive to the video control program 119 receives user input and selects the at least one video program 106, in response thereto. Next, at step 308, the terminal controller 120 responsive to the video control program 119 streams the recorded initial program segment 106a associated with the selected video program 122 to the display interface 116 for display on the display device 104. At step 310, the terminal controller 120 responsive to the video control program 119 retrieves and records the remaining program segments 106$_{b-z}$ associated with the selected video program 122 currently being broadcasted in local memory 118. Continuing at step 312, the terminal controller 120 responsive to the video control program 119 streams recorded remaining program segments 106$_{b-z}$ to the display interface 116 for display on the display device 104. Lastly, at step 314, the terminal controller 120 responsive to the video control program 119 directs a billing system 154 at the video distribution system 102 to bill a client associated with the client terminal 100 for the selected video program 122.

While the present invention and its various functional components have been described in particular embodiments, it should be appreciated the present invention can be implemented in hardware, software, firmware, middleware or a combination thereof and utilized in systems, subsystems, components, or sub-components thereof. When implemented in software, the elements of the present invention are the instructions/code segments to perform the necessary tasks. The program or code segments can be stored in a machine readable medium, such as a processor readable medium or a computer program product, or transmitted by a computer data signal embodied in a carrier wave, or a signal modulated by a carrier, over a transmission medium or communication link. The machine-readable medium or processor-readable medium may include any medium that can store or transfer information in a form readable and executable by a machine (e.g. a terminal controller, a processor, a computer, etc.). Examples of the machine/processor-readable medium include an electronic circuit, a semiconductor memory device, a ROM, a flash memory, an erasable programmable ROM (EPROM), a floppy diskette, CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

We claim:

1. A method of providing movies or television programs to a client terminal, the client terminal connectable to a video distribution system and a display device, the method comprising the steps of:
   splitting a complete movie or television program by the video distribution system into an initial program segment and a remaining program segment, wherein the initial program segment is separately broadcast by the video distribution system during a first broadcast time interval during which the remaining program segment is not broadcast and the remaining program segment is separately broadcast by the video distribution system during a second broadcast time interval during which the initial program segment is not broadcast;
   during the first broadcast time interval, automatically recording the initial program segment of the complete movie or television program in a local memory without user input at the client terminal, wherein the first broadcast time interval occurs during an off-peak hour;
   during the second broadcast time interval, at the client terminal:
   i. receiving a user input to select a movie or television program to play;
   ii. streaming the recorded initial program segment associated with the selected movie or television program from the local memory to the display device;
   iii. selecting a remaining program segment associated with the selected movie or television program that is currently being broadcast from the video distribution system and recording the selected remaining program segment in the local memory, wherein the remaining program segment is a segment of the complete movie or television program that does not include the initial program segment of the complete movie or television program, and wherein the selected remaining program segment is at least one of a plurality of remaining program segments, in which each one of the plurality of remaining program segments is repetitively broadcast on a channel of a plurality of channels that only broadcasts remaining program segments, and wherein each of the remaining program segments on each of the channels has a separate start time from the other start times of the other remaining program segments and at least two remaining program segments are of equal size; and
   iv. streaming the recorded remaining program segment from the local memory to the display device such that the recorded remaining program segment is appended to the initial program segment.

2. The method of claim 1, wherein, the initial program segment includes a plurality of initial packets, each initial packet having a plurality of time stamps (TSs), a last packet of the initial packets including a last TS value, and the remaining program segment also including a plurality of packets, each packet having a plurality of time stamps (TSs), a first packet of the plurality of packets including an initial TS value, such that the step of appending the recorded remaining program segment to the initial program segment includes appending the recorded remaining program segment at the initial TS value to the last TS value of the initial program segment.

3. The method of claim 1, wherein, the local memory includes a rotating storage disk for storing the initial program segment and the remaining program segment.

4. The method of claim 1, wherein, the local memory includes semiconductor memory for storing the initial program segment and the remaining program segment.

5. The method of claim 1, further comprising the step of:
(a) in response to the selection of the at least one video program, directing a billing system at the video distribution system to bill a client associated with the client terminal.

6. The method of claim 5, wherein, the step of directing the billing system to bill the client occurs simultaneously with the step of streaming the recorded initial program segment to the display device.

7. The method of claim 1, wherein, the off-peak hour comprises a time period during which client terminals are minimally utilized by users.

8. A system to provide movies or television programs, the system comprising:
a video distribution system to split a complete movie or television program into an initial program segment and a remaining program segment, wherein the initial program segment is separately broadcast by the video distribution system during a first broadcast time interval during which the remaining program segment is not broadcast and the remaining program segment is separately broadcast by the video distribution system during a second broadcast time interval during which the initial program segment is not broadcast; and
a client terminal, the client terminal including a processor to:
during the first broadcast time interval, automatically record the initial program segment of the whole complete movie or television program in a local memory without user input at the client terminal, wherein the first broadcast time interval occurs during an off-peak hour;
during the second broadcast time interval:
i. receive a user input to select at least a movie or television program to play;
ii. stream the recorded initial program segment associated with the selected movie or television program from the local memory to a display device;
iii. select a remaining program segment associated with the selected movie or television program that is currently being broadcast from the video distribution system and recording the selected remaining program segment in the local memory, wherein the remaining program segment is a segment of the complete movie or television program that does not include the initial program segment of the complete movie or television program, and wherein the selected remaining program segment is at least one of a plurality of remaining program segments, in which each one of the plurality of remaining program segments is repetitively broadcast on a channel of a plurality of channels that only broadcasts remaining program segments, and wherein each of the remaining program segments on each of the channels has a separate start time from the other start times of the other remaining program segments and at least two remaining program segments are of equal size; and
iv. stream the recorded remaining program segment from the local memory to the display device such that the recorded remaining program segment is appended to the initial program segment.

9. The system of claim 8, wherein, the initial program segment includes a plurality of initial packets, each initial packet having a plurality of time stamps (TSs), a last packet of the initial packets including a last TS value, and the remaining program segment also including a plurality of packets, each packet having a plurality of time stamps (TSs), a first packet of the plurality of packets including an initial TS value, such that the step of appending the recorded remaining program segment to the initial program segment includes appending the recorded remaining program segment at the initial TS value to the last TS value of the initial program segment.

10. The system of claim 8, wherein, the local memory includes a rotating storage disk for storing the initial program segment and the remaining program segment.

11. The system of claim 8, wherein, the local memory includes semiconductor memory for storing the initial program segment and the remaining program segment.

12. The system of claim 8, wherein, in response to the selection of the at least one video program, a billing system at the video distribution system is directed to bill a client associated with the client terminal.

13. The system of claim 12, wherein, the step of directing the billing system to bill the client occurs simultaneously with the step of streaming the recorded initial program segment to the display device.

14. The system of claim 8, wherein, the off-peak hour comprises a time period during which client terminals are minimally utilized by users.

\* \* \* \* \*